(12) United States Patent
Sasaki

(10) Patent No.: US 9,070,077 B2
(45) Date of Patent: Jun. 30, 2015

(54) INFORMATION PROCESSING APPARATUS, INFORMATION PROCESSING SYSTEM, AND COMPUTER-READABLE RECORDING MEDIUM FOR CONTROLLING A HOLDING PERIOD OF OUTPUT DATA

(71) Applicant: Koji Sasaki, Kanagawa (JP)

(72) Inventor: Koji Sasaki, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/016,536

(22) Filed: Sep. 3, 2013

(65) Prior Publication Data

US 2014/0078553 A1 Mar. 20, 2014

(30) Foreign Application Priority Data

Sep. 18, 2012 (JP) ................................. 2012-203860

(51) Int. Cl.
*G06K 15/02* (2006.01)
*G06F 3/12* (2006.01)

(52) U.S. Cl.
CPC .......... *G06K 15/1888* (2013.01); *G06F 3/1203* (2013.01); *G06F 3/122* (2013.01); *G06F 3/1267* (2013.01); *G06F 3/1274* (2013.01); *G06F 3/1285* (2013.01); *G06F 3/1288* (2013.01)

(58) Field of Classification Search
CPC ... G06K 15/02; G06K 15/18; G06K 15/1867; G06K 15/1886; G06K 15/1888; G06K 15/40; G06F 3/1237; G06F 3/1239; G06F 3/126; G06F 3/1267
USPC ................. 358/1.1, 1.15, 1.16, 400, 401, 403
See application file for complete search history.

(56) References Cited

U.S. PATENT DOCUMENTS 8,332,958 B2 * 12/2012 Nishimi et al. .................. 726/28
2008/0007793 A1 * 1/2008 Filbrich et al. ................ 358/440

FOREIGN PATENT DOCUMENTS

JP 2003-039771 2/2003
JP 2004-188618 7/2004

* cited by examiner

*Primary Examiner* — Thomas D Lee
(74) *Attorney, Agent, or Firm* — Harness, Dickey & Pierce, P.L.C.

(57) ABSTRACT

An information processing apparatus includes: a storage unit configured to record output data to a first storage unit; an administration unit configured to administer a holding period of the output data held by the first storage unit; a setting unit configured to set the holding period of the output data; a second storage unit configured to store condition information used to determine whether or not to accept the setting of the holding period for the output data; a reception unit configured to receive a setting request of a holding period for the output data; and a setting control unit configured to control the setting of the holding period for the output data with the setting unit, on the basis of the condition information in accordance with the setting request.

19 Claims, 8 Drawing Sheets

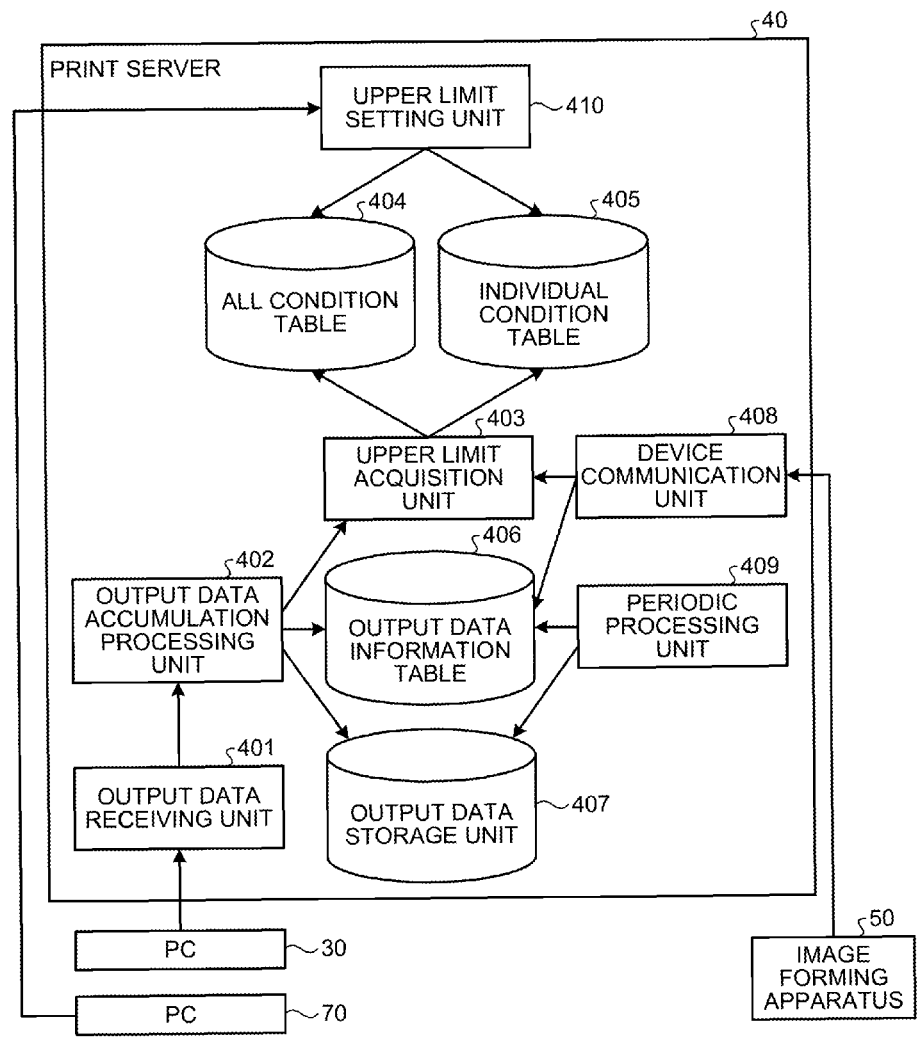

FIG.6

ALL CONDITION TABLE

| PARAMETER NAME | PARAMETER VALUE |
|---|---|
| OUTPUT DATA SIZE UPPER LIMIT | 10 MB |
| HOLDING PERIOD | SEVEN DAYS |

FIG.7

INDIVIDUAL CONDITION TABLE

| USER NAME | OUTPUT DATA SIZE UPPER LIMIT |
|---|---|
| User1 | 20 MB |
| User3 | 5 MB |

FIG.8

OUTPUT DATA INFORMATION TABLE

| OUTPUT DATA ID | USER NAME | SIZE | OUTPUT DATA NAME | ACCUMULATION TIME | HOLDING TIME LIMIT |
|---|---|---|---|---|---|
| 1 | User1 | 5 MB | CALENDAR IN FISCAL YEAR 2012.doc | 2011/12/15 12:34:25 | 2013/01/01 00:00:00 |
| 2 | User2 | 3 MB | SUGGESTION.ppt | 2012/02/24 10:27:52 | NOT-SET |
| 3 | User1 | 4 MB | USER LIST IN FISCAL YEAR 2011.xls | 2011/04/20 15:20:48 | 2012/04/01 00:00:00 |
| 4 | User3 | 3 MB | TEST.doc | 2012/02/23 09:43:21 | NOT-SET |
| 5 | User1 | 2 MB | BILL IN JANUARY.pdf | 2012/02/24 16:32:05 | NOT-SET |

FIG.12

| GROUP NAME | USER NAME |
|---|---|
| GroupA | User1 |
| | User3 |
| GroupB | User2 |
| | User4 |

FIG.13

INDIVIDUAL CONDITION TABLE

| GROUP NAME | OUTPUT DATA SIZE UPPER LIMIT |
|---|---|
| GroupA | 20 MB |
| GroupB | 5 MB |

FIG.14

OUTPUT DATA INFORMATION TABLE

| GROUP NAME | USER NAME | OUTPUT DATA ID | SIZE | ... |
|---|---|---|---|---|
| GroupA | User1 | 1 | 5 MB | ... |
| | User1 | 3 | 4 MB | ... |
| | User3 | 4 | 3 MB | ... |
| | User1 | 5 | 2 MB | ... |
| GroupB | User2 | 2 | 3 MB | ... |

INFORMATION PROCESSING APPARATUS, INFORMATION PROCESSING SYSTEM, AND COMPUTER-READABLE RECORDING MEDIUM FOR CONTROLLING A HOLDING PERIOD OF OUTPUT DATA

CROSS-REFERENCE TO RELATED APPLICATIONS

The present application claims priority to and incorporates by reference the entire contents of Japanese Patent Application No. 2012-203860 filed in Japan on Sep. 18, 2012.

BACKGROUND OF THE INVENTION

1. Field of the Invention

This invention relates to an information processing apparatus and an information processing system for recording output data to a storage unit, and a computer-readable recording medium that contains a program for causing a computer to function as the information processing apparatus explained above.

2. Description of the Related Art

In the past, it is known that data for output (output data) are transmitted from a client apparatus such as a PC (personal computer) to an output apparatus such as an image forming apparatus, a projection apparatus, and a display apparatus, and output is done in accordance with the output data. This output is considered to be print output in a case of an image forming apparatus. The output is considered to be projection of an image onto a screen in a case of a projection apparatus. The output is considered to be display of a document or an image on a display in a case of a display apparatus.

Among the above cases, in the case where a print job is transmitted as output data to the image forming apparatus, hold print function (on demand print function) is known, in which the print job is once accumulated and output in accordance with a command given by a user. This is because when the image forming apparatus outputs the print job as soon as receiving the print job, the print material which has been output may be left and abandoned.

However, when this hold print function allows the print job to be accumulated without any time limit, the capacity of the storage unit is occupied, and therefore, it is suggested to automatically delete a job from the apparatus when a holding period passes.

For example, Japanese Laid-open Patent Publication No. 2003-39771 indicates that, when print job data are registered, a holding period is set, and when the holding period passes, the print job data are deleted.

However, when the holding period is set, and a user is allowed to set the holding period in units of jobs, then the user may set unnecessarily long period, and there is a problem in that it is impossible sufficiently obtains the effect of reducing the capacity of the storage unit.

On the other hand, an administrator may uniformly set uniform holding period, but in this case, a print job which a user is planning to output later may also be deleted against the will of the user, and this may make it inconvenient.

This kind of problem may also occur even when output data other than print jobs are accumulated or when accumulation is done with a storage unit provided outside of the output apparatus.

This invention is made in view such circumstances, and it is an object of this invention to alleviate the occupied capacity in the storage unit while making it less inconvenient when output data are accumulated in the storage unit.

SUMMARY OF THE INVENTION

It is an object of the present invention to at least partially solve the problems in the conventional technology.

According to the present invention, there is provided: an information processing apparatus including: a storage unit configured to record output data to a first storage unit; an administration unit configured to administer a holding period of the output data held by the first storage unit; a setting unit configured to set the holding period of the output data; a second storage unit configured to store condition information used to determine whether or not to accept the setting of the holding period for the output data; a reception unit configured to receive a setting request of a holding period for the output data; and a setting control unit configured to control the setting of the holding period for the output data with the setting unit, on the basis of the condition information in accordance with the setting request.

The present invention also provides an information processing system connected to the plurality of information processing apparatuses via a network and transmitting and receiving data, any one of a plurality of information processing apparatuses constituting the information processing system comprising: a storage unit configured to record output data to a first storage unit; an administration unit configured to administer a holding period of the output data held by the first storage unit; a setting unit configured to set the holding period of the output data; a second storage unit configured to store condition information used to determine whether or not to accept the setting of the holding period for the output data; a reception unit configured to receive a setting request of a holding period for the output data; and a setting control unit configured to control the setting of the holding period for the output data with the setting unit, on the basis of the condition information in accordance with the setting request.

The present invention also provides a non-transitory computer-readable recording medium that contains a computer program that causes a computer to function as a storage unit configured to record output data to a first storage unit; an administration unit configured to administer a holding period of the output data held by the first storage unit; a setting unit configured to set the holding period of the output data; a second storage unit configured to store condition information used to determine whether or not to accept the setting of the holding period for the output data; a reception unit configured to receive a setting request of a holding period for the output data; and a setting control unit configured to control the setting of the holding period for the output data with the setting unit, on the basis of the condition information in accordance with the setting request.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a figure illustrating a configuration of a function related to accumulation of output data in a print server as illustrated in FIG. 2;

FIG. 6 is a figure illustrating an example of data registered to an all condition table;

FIG. 7 is a figure illustrating an example of data registered to an individual condition table;

FIG. 8 is a figure illustrating an example of data registered to an output data information table;

FIG. 12 is a figure illustrating an example of group data according to a modification;

FIG. 13 is a figure illustrating an example of data registered to an individual condition table according to a modification;

FIG. 14 is a figure illustrating an example of data registered to an output data information table according to a modification.

DETAILED DESCRIPTION OF THE PREFERRED EMBODIMENTS

Hereinafter, an embodiment for carrying out this invention will be hereinafter explained in a more specific manner with reference to drawings.

Figure 1:
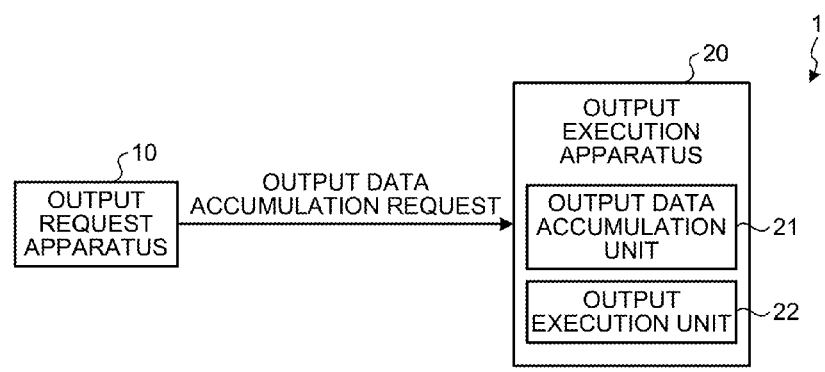
FIG. 1 is a figure illustrating a configuration of an information processing system including an output execution apparatus which is a first embodiment of an information processing apparatus of this invention.

FIG. 1 is a figure illustrating a configuration of an information processing system including an output execution apparatus which is a first embodiment of an information processing apparatus of this invention.

An information processing system 1 as illustrated in FIG. 1 includes an output request apparatus 10 and an output execution apparatus 20.

Among them, the output request apparatus 10 is an information processing apparatus requesting the output execution apparatus 20 to perform output. At this occasion, an output data accumulation request is transmitted to the output execution apparatus 20, and the output data indicating the contents of output are once accumulated in the output execution apparatus 20, and thereafter, in response to a command given separately, the output according to the output data can be executed. This command given separately may be a command given when a user directly operates the output execution apparatus 20 or may be achieved by causing an external apparatus such as the output request apparatus 10 to transmit data.

On the other hand, the output execution apparatus 20 includes an output data accumulation unit 21 and an output execution unit 22.

Among them, the output data accumulation unit 21 includes a storage unit, and the output data are accumulated in the storage unit in accordance with the output data accumulation request received from the external apparatus such as the output request apparatus 10. At this occasion, the setting of the holding period of the output data is controlled on the basis of designation with the output data accumulation request and various kinds of settings made in the output data accumulation unit 21 in advance. This function is a function as an embodiment of an information processing apparatus of this invention.

The output execution unit 22 is an output unit for performing output according to the output data accumulated in the output data accumulation unit 21 in accordance with the "command given separately" explained above. Specifically what kind of output is performed is dependent upon the function of the output execution apparatus 20. The form of the output is considered to be as follows. When the output execution apparatus 20 is configured as an image forming apparatus such as a printer, the form of the output is considered to be print output. When the output execution apparatus 20 is configured as a projection apparatus such as a projector, the form of the output is considered to be projection onto a screen. When the output execution apparatus 20 is configured as a display apparatus such as a tablet terminal and a display, the form of the output is considered to be display of a document and an image using a display. Further, the output execution unit 22 includes an engine for the output.

In the output execution apparatus 20 explained above, the output data accumulation unit 21 stores, in advance, condition information used for determining whether or not setting of a holding period for output data is accepted. When the output data accumulation request with the setting of the holding period is received, a determination as to whether or not the setting of the holding period in the request is accepted according to the condition information. Then, in accordance with the determination result, the setting of the holding period for the output data accumulated in response to the request is controlled.

More specifically, when the condition indicated by the condition information is satisfied, a holding period according to the request is set. When the condition is not satisfied, the holding period is not set. In the latter case, uniform holding period registered in advance is applied.

According to the above, when a certain condition is satisfied, the user is allowed to make setting of the holding period freely, and when the condition is beyond the range, uniform holding period determined by the administrator can be applied. Therefore, when the condition is set appropriately, the reduction of convenience is suppressed, while occupying of the space in the storage unit can be alleviated.

As this condition, a condition about the amount of data of output data is preferably set. This includes the total size of the output data accumulated, the number of accumulations, the size of the output data accumulated this time, and the like. This can prevent accumulation of large-size output data, which may occupy the space of the storage unit, for a long period of time beyond expectation of the administrator, and this is effective for alleviating occupying of the space. When this kind of condition can be set for each user or each group including one or more users, more flexible operation can be done.

The setting of the holding period may preferably be done not only during accumulation of the output data but also after the accumulation.

Subsequently, a second embodiment will be explained in a more specific manner.

Figure 2:
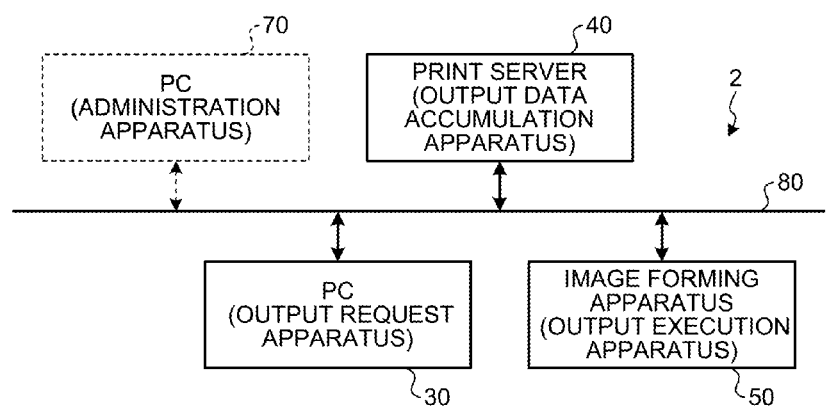
FIG. 2 is a figure illustrating a configuration of an information processing system including an image processing server which is a second embodiment of an information processing apparatus of this invention.

FIG. 2 is a figure illustrating a configuration of an information processing system including an image processing server which is a second embodiment of an information processing apparatus of this invention.

The information processing system 2 as illustrated in FIG. 2 includes PCs 30, 70, a print server 40, and an image forming apparatus 50, and these apparatuses can communicate with each other via a network 80. For example, the network 80 may be a LAN (local area network), but regardless of wired network or wireless network, any given method may be employed.

The PC 30 has a function corresponding to the output request apparatus 10 of FIG. 1. However, destination of transmission of the output data accumulation request is the print server 40.

The print server 40 has a function of managing a job which is to be executed by the image forming apparatus 50, and has an accumulation function for accumulating output data corresponding to the output data accumulation unit 21 as illustrated in FIG. 1. In addition, the print server 40 has a function of spontaneously select a destination of transmission of output data which are to be output by the image forming apparatus 50, or transmitting output data to the image forming apparatus 50 and in response to a request of the image forming apparatus 50 and causing the image forming apparatus 50 to execute printing. In this embodiment, the output data are data of a print job indicating the contents of printing which is to be executed by the image forming apparatus 50.

The image forming apparatus 50 has a function of forming an image on a sheet in accordance with output data which are transmitted from the print server 40, and has an output function corresponding to the output execution unit 22 as illustrated in FIG. 1. In addition, the image forming apparatus 50 has a function of requesting the print server 40 to send a list of pieces of output data accumulated therein and presenting the list to the user, and requesting the print server 40 to send the output data selected by the user from among them and obtaining the output data.

By using this function, the user can directly manipulate the image forming apparatus 50 to command the execution of printing of the output data accumulated in the print server 40 when the user manipulated the PC 30. More specifically, the hold print function can be realized.

The PC 70 functions as an administration apparatus of the print server 40, and has a function of requesting change of setting of the print server 40. This setting includes condition information used for determination as to whether the setting of the holding period is accepted or not during output data accumulation and uniform setting of the holding period that is applied when a holding period is not set.

However, it is not necessary to provide the PC 70 and the PC 30 as separate apparatuses. The PC 70 and the PC 30 may be the same apparatus. In this sense, the PC 70 is indicated by a broken line.

Figure 3:
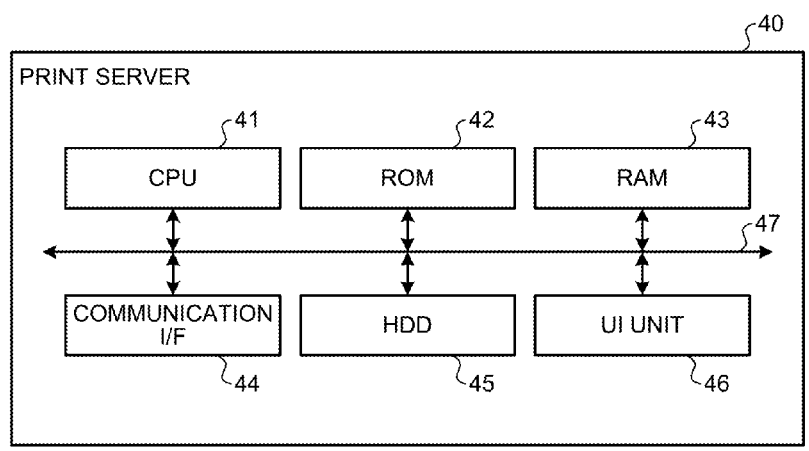
FIG. 3 is a figure illustrating a hardware configuration of a print server as illustrated in FIG. 2.

Now, FIG. 3 shows a hardware configuration of the print server 40.

As necessary, a publicly-known computer serving as hardware may be employed as the print server 40. For example, as illustrated in FIG. 3, the print server 40 may include a CPU 41, a ROM 42, a RAM 43, a communication I/F 44, a HDD (hard disk drive) 45, and a UI (user interface) unit 46, which are connected via a system bus 47.

Then, the CPU 41 uses the RAM 43 as a work area to execute a program stored in the ROM 42 or the HDD 45, thus controlling entire operation of the print server 40, and achieves various kinds of functions such as control of accumulation of output data explained later.

The HDD 45 functions as a first storage unit storing output data and a second storage unit storing condition information.

The communication I/F 44 is an interface for communicating with an external apparatus such as the PC 30 and the image forming apparatus 50 via a network such as a LAN (local area network).

The UI unit 46 is an operation reception unit including an operating unit for receiving user's operation and a display unit for presenting information to the user. It is to be understood that an operating unit and a display unit which are externally attached may also be used.

The user's operation may be received by receiving data indicating the contents of operation from an external apparatus. Information may be presented to the user by transmitting data indicating the contents of display on the screen and data which are to be displayed on the screen to the external apparatus.

The hardware configuration of the PC 30 is also the same as the print server 40 within a range of FIG. 3.

Figure 4:
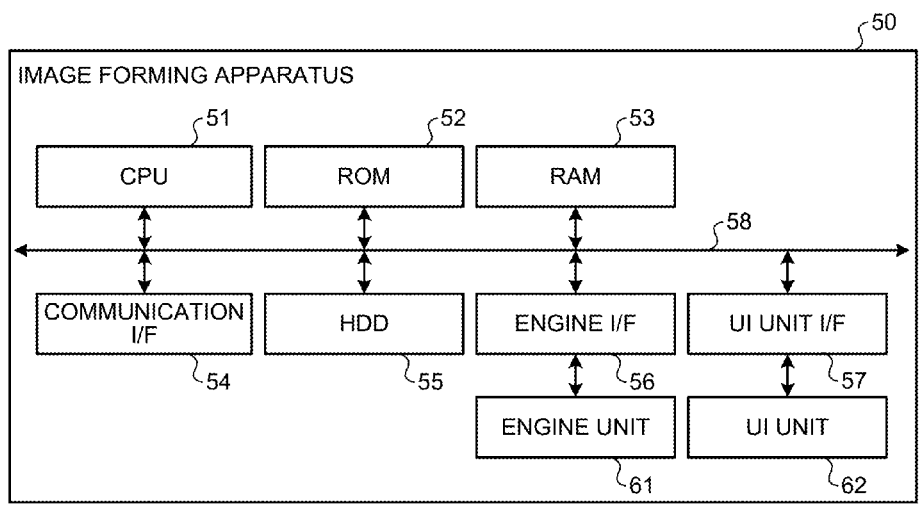
FIG. 4 is also a figure illustrating a hardware configuration of an image forming apparatus as illustrated in FIG. 2.

Subsequently, FIG. 4 illustrates a hardware configuration of the image forming apparatus 50.

The image forming apparatus 50 can employ the same hardware configuration as a publicly-known image forming apparatus as necessary. For example, as illustrated in FIG. 4, the image forming apparatus 50 includes a CPU 51, a ROM 52, a RAM 53, a communication I/F 54, a HDD 55, an engine I/F (interface) 56, and a UI unit I/F 57, which are connected via a system bus 58. The engine I/F 56 is connected to the engine unit 61, and the UI unit I/F 57 is connected to the UI unit 62.

The CPU 51 uses the RAM 53 as a work area to execute a program stored in the ROM 52 or the HDD 55 and controls overall operation of the image forming apparatus 50, and can achieve various kinds of functions such as request of output data to the print server 40 and execution of output based on the output data explained later.

The communication I/F 54 is an interface for communicating with an external apparatus such as the print server 40 via a network such as a LAN (local area network).

The engine unit 61 represents a unit for physical output other than communication and display to the outside, such as an image forming engine.

The engine I/F 56 is an interface for connecting the engine unit 61 and the CPU 51 and allowing the CPU 51 to control the engine unit 61.

The UI unit I/F 57 is an interface for connecting the UI unit 62 and the CPU 51 and allowing the CPU 51 to control the UI unit 62.

The UI unit 62 is an operation reception unit including an operating unit for receiving user's operation and a display unit for presenting information to the user. It is to be understood that an operating unit and a display unit which are externally attached may also be used.

The user's operation may be received by receiving data indicating the contents of operation from an external apparatus. Information may be presented to the user by transmitting data indicating the contents of display on the screen and data which are to be displayed on the screen to the external apparatus.

In the information processing system 2 as described above, one of the distinguishing features is the function of accumulation of output data in the print server 40. Accordingly, this feature will be hereinafter explained.

First, FIG. 5 illustrates a configuration of a function related to accumulation of output data in the print server 40.

As illustrated in FIG. 5, the print server 40 includes an output data receiving unit 401, an output data accumulation processing unit 402, an upper limit acquisition unit 403, an all condition table 404, an individual condition table 405, an output data information table 406, an output data storage unit 407, a device communication unit 408, a periodic processing unit 409, and an upper limit setting unit 410.

Among them, the output data receiving unit 401 has a function of receiving output data, which are to be accumulated, and an output data accumulation request transmitted from an external apparatus such as the PC 30. This output data accumulation request may include setting request of the holding period of the output data. In addition, a function serving as a reception unit for receiving this setting request is provided.

The output data accumulation processing unit 402 has a function of a storage unit for storing the output data to the output data storage unit 407 in response to reception of an output data accumulation request. In addition, the output data accumulation processing unit 402 has a function of a setting unit for setting a holding period for the output data and has a function of a setting control unit for controlling the setting of the holding period on the basis of the condition of the capacity upper limit obtained by the upper limit acquisition unit 403. In this example, the holding period for each piece of output data is set in a form of a holding time limit. For this control, a function of a determination unit for determining whether the holding period can be set or not is also provided. These functions will be explained later in detail.

The upper limit acquisition unit 403 has a function of obtaining a condition the upper limit of the size for the user of the output data, with regard to the output data which are to be accumulated by the output data accumulation processing unit 402 or the output data of which holding dead line is to be changed by the device communication unit 408. This acquisition is done with the all condition table 404 or the individual condition table 405.

Among them, the all condition table 404 stores condition information that is commonly applied to users having no individual setting. The individual condition table 405 stores condition information applied to each user. Each of them corresponds to the second storage unit. The contents of these tables are to be set by administrators of the print server 40 and the image forming apparatus 50.

Information stored in the all condition table 404 is what is shown in FIG. 6, and stores the upper limit of the size of the output data and the holding period.

The upper limit of the size of the output data is a condition of data size per user accumulated in the output data storage unit. Each user is allowed to freely set the holding time limit until the total size of the output data accumulated by the user is more than this the upper limit of the size of the output data.

The holding period is a holding period automatically applied when the total size of the output data accumulated is more than the upper limit of the size of the output data. When it is more than the upper limit of the size of the output data, the user is not allowed to freely set the holding period, and a time the fixed holding period after the time when the output data were accumulated is adopted as a holding time limit, and the output data which exceeded the time limit are automatically deleted.

On the other hand, information stored in the individual condition table is what is shown in FIG. 7, and stores the upper limit of the size of the output data for each user.

The purpose of the data is the same as the upper limit of the size of the output data of the all condition table 404, but not the condition of the all condition table 404 but the condition in the individual condition table 405 is applied to the users whose individual conditions are registered therein.

Therefore, when the condition about the user of the output data which is to be accumulated or of which holding dead line is to be changed is registered in the individual condition table 405, the upper limit acquisition unit 403 obtains the condition thereof. When the condition is not registered therein, the upper limit acquisition unit 403 obtains the condition registered in the all condition table 404.

Subsequently, the output data information table 406 has a function of storing information about the output data accumulated in the output data storage unit 407.

Information stored in the output data information table 406 is what is shown in FIG. 8, and the output data information table 406 stores an output data ID, a user name, a size, an output data name, an accumulation time, and a holding time limit for each piece of output data.

Among them, the output data ID is identification information which the print server 40 gives the output data accumulated. The user name is identification information of the user who requested accumulation of the output data. The size is the size of the output data. The output data name is a file name of the output data. The accumulation time is the time when the output data are accumulated. The holding time limit is the holding time limit of the output data and the output data which exceeds this are deleted as necessary. When the setting is made according to user's request, a specific time is set. When the holding time of the all condition table 404 is applied, the holding time limit is not-set.

Subsequently, the device communication unit 408 has a function of a reception unit for receiving a request of change (including new setting) and deletion of the holding time limit for the output data accumulated in the output data storage unit 407 from an external apparatus such as the image forming apparatus 50. In addition, the device communication unit 408 includes functions of a setting unit, a setting control unit, and a determination unit for setting the holding period in accordance with this request. In addition, the device communication unit 408 also has a function of receiving a request of a list of output data accumulated and a transmission request of output data used for output and reading necessary data from the output data information table 406 and the output data storage unit 407 in accordance thereto and transmitting the data to the request source apparatus.

The periodic processing unit 409 has a function of checking whether there is any output data which exceeded the holding dead line with a regular interval, and deleting the data which exceeds the holding time limit from the output data information table 406 and the output data storage unit 407.

The upper limit setting unit 410 has a function of receiving change request of various kinds of settings stored in the all condition table 404 and the individual condition table 405 from an external apparatus such as the PC 70 and changing the setting in accordance thereto.

Subsequently, the processing corresponding to the function of each unit explained above will be explained. The processing shown in each flowchart below is performed by causing the CPU 41 of the print server 40 to execute a required program.

Figure 9:
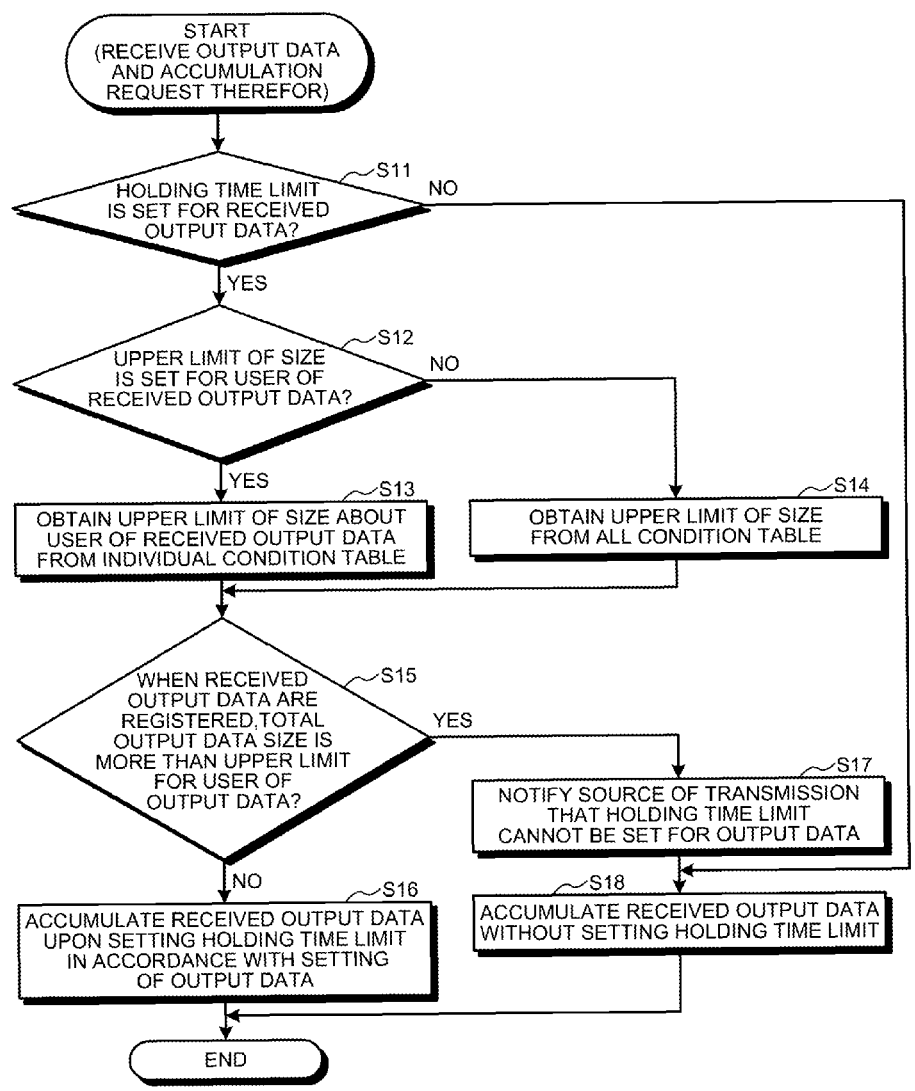
FIG. 9 is a flowchart illustrating processing performed by a CPU of a print server as illustrated in FIG. 2 in a case where output data are received.

First, FIG. 9 illustrates processing of a case in which the output data are received. This processing is processing corresponding to the functions of the output data accumulation processing unit 402 and the upper limit acquisition unit 403.

When the CPU 41 detects reception of the output data and the accumulation request thereof from an external apparatus such as the PC 30 with the function of the output data receiving unit 401, the CPU 41 starts processing as shown in the flowchart of FIG. 9.

Then, first, a determination is made as to whether the holding time limit is set for the received output data (S11). When it is set, a determination is made as to whether the individual condition table 405 stores the setting of the upper limit of the size of the output data for the user requesting accumulation of the received output data (S12). Then, when it is set, information about the upper limit of the size of the output data for the user is obtained from the individual condition table 405 (S13). When the setting is not stored, information about the upper limit of the size of the output data is obtained from the all condition table 404 (S14).

In any case, when the received output data are thereafter registered, a determination is made as to whether the total output data size is more than the upper limit of the size of the output data for the user requesting accumulation of the output data (S15).

When the total output data size is not more than the upper limit of the size of the output data, it is determined that the user may be allowed to set the holding time limit, and the received output data are accumulated upon setting the holding time limit according to the setting for the output data (S16), and the processing is terminated. More specifically, information about the output data is registered to the output data information table 406, and in addition, the output data are recorded to the output data storage unit 407. It may be possible to transmit a message to that effect to the source of transmission of the output data.

On the other hand, when the total output data size is more than the upper limit in step S15, it is determined that the user is not to be allowed to set the holding time limit, and a message indicating that the holding time limit cannot be set for the output data is transmitted to the source of transmission (S17). Then, the received output data are accumulated without setting the holding time limit (S18), and the processing is terminated.

Even when the holding time limit is not set in step S11, the received output data are likewise accumulated without setting the holding time limit (S18), and the processing is terminated.

In the above processing, the processing in steps S16 and S18 corresponds to the function of the storage unit, the processing in step S16 corresponds to the function of the setting unit, the processing in steps S12 to S18 corresponds to the function of the setting control unit, and the processing in step S15 corresponds to the function of the determination unit.

By performing the above processing, the user is allowed to freely set the holding time limit as long as the size is within the upper limit of the size of the output data, whereas when the size is more than the upper limit, the holding period that was set by the administrator can be applied.

Therefore, for output data which the user wants to be held for a long period of time, the user's request is satisfied, so that the reduction of convenience is suppressed, and at the same time, accumulation of a large amount of data for a long period of time is prevented, so that the occupied capacity in the storage unit can be alleviated. More specifically, there is an advantage in that this saves the trouble of accumulating, over and over again with the PC 30, the output data that is considered by the user to be frequently printed or printed with a high degree of possibility, and there is an advantage for the administrator in that the cost of introduction and operation of the storage unit such as the HDD 45 can be saved.

In addition, the condition of the output data size can be set for each user, and therefore, flexible service can be provided in view of the circumstances of each user. The holding period that is applied when the size is more than the upper limit of the size can be set by the administrator, and therefore, administration can be done appropriately in view of the capacity of the storage unit.

The output data accumulated in the processing of FIG. 9 can be deleted in response to user's command even before the holding time limit comes.

Figure 10:
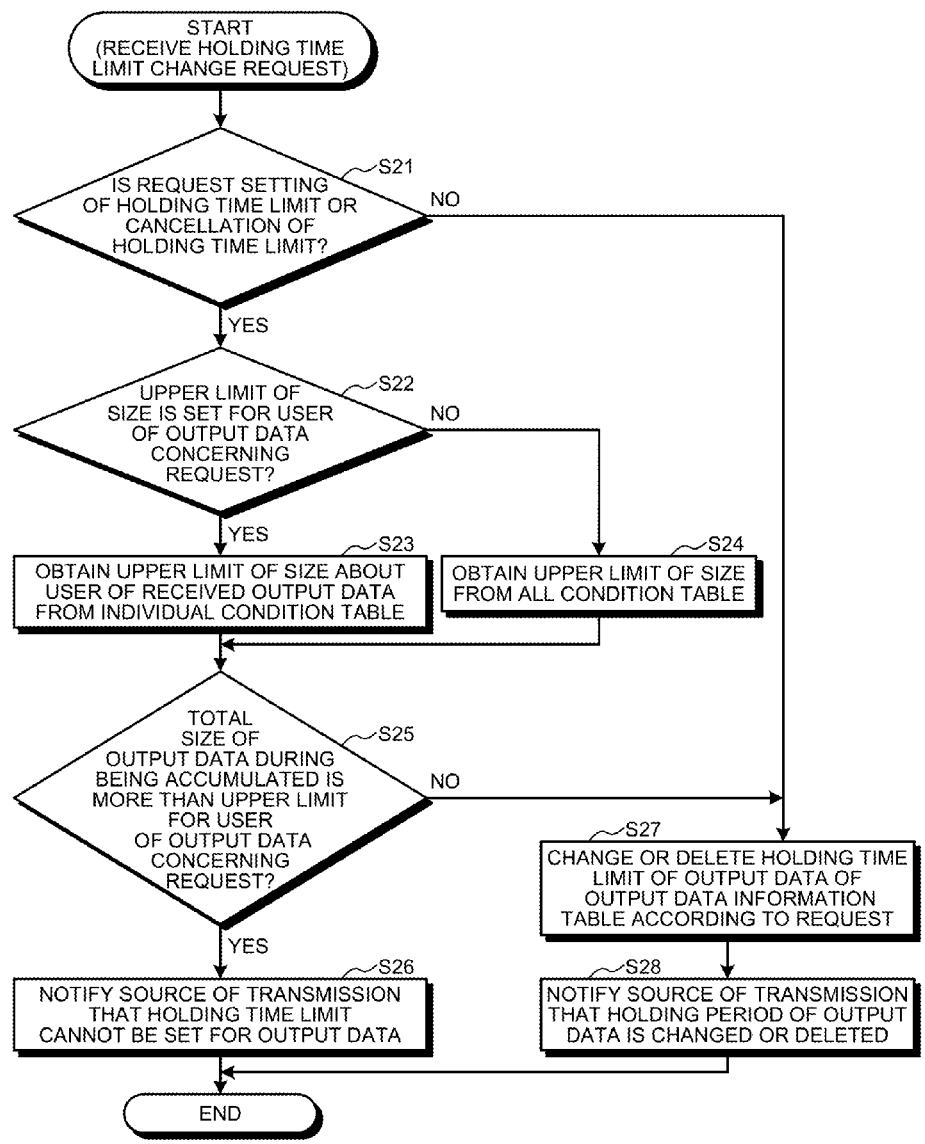
FIG. 10 is a flowchart illustrating processing performed by a CPU of a print server as illustrated in FIG. 2 in a case in which a holding time limit change request is received.

Subsequently, FIG. 10 illustrates processing when a holding time limit change request is received. This processing is processing corresponding to the functions of the device communication unit 408 and the upper limit acquisition unit 403.

When the CPU 41 detects reception of a holding time limit change request from an external apparatus such as the image forming apparatus 50 with the function of the device communication unit 408, the CPU 41 starts processing as illustrated in the flowchart of FIG. 10. This holding time limit change request is a setting request of the holding time limit that is done after the accumulation of the output data.

Then, first, a determination is made as to whether what has been requested by the received holding time limit change request is setting of holding time limit or is not the setting but is cancellation of the holding time limit (S21). Then, when it is determined to be the setting (YES in step S21), a determination is made as to whether the individual condition table 405 registers the setting of the upper limit of the size of the output data for the user of the output data of which the holding time limit is requested to be changed (the user whose user ID is registered in the output data information table 406 in association with the output data) (S22). Then, when the setting is registered, information about the upper limit of the size of the output data for the user is obtained from the individual condition table 405 (S23). When the setting is not registered, information about the upper limit of the size of the output data is obtained from the all condition table 404 (S24).

In any case, thereafter, a determination is made as to whether or not the total size of the output data during accumulation for the user of the output data concerning the request of the setting change is more than the upper limit obtained in step S23 or S24 (S25).

Then, when YES in step S25, it is determined that the user is not to be allowed to set the holding time limit, and a message indicating that the holding time limit cannot be set for the output data is notified to the source of transmission (S26), and the processing is terminated.

On the other hand, when NO in step S25, it is determined that the user may be allowed to set the holding time limit, and the holding time limit of the output data stored in the output data information table 406 is changed according to the request (S27), and a message to that effect is notified to the source of transmission (S28), and the processing is terminated. The setting of the holding time limit includes change of the holding time limit that has been set already.

When what has been requested by the received holding time limit change request is not the setting but is cancellation of the holding time limit (NO) in step S21, this means that allowance may be given regardless of the total size of the output data during accumulation, and therefore, step S27 is subsequently performed, and the holding time limit of the output data is deleted (S27) and a message to that effect is notified (S28), and the processing is terminated. When the setting of the holding time limit is deleted, the holding time limit for the output data is not-set, and the holding period registered in the all condition table 404 is applied.

In the above processing, the processing in step S27 corresponds to the function of the setting unit, the processing in steps S22 to S27 corresponds to the function of the setting control unit, and the processing in step S25 corresponds to the function of the determination unit.

By performing the above processing, even after the output data are once accumulated, the user may be allowed to change the setting of the holding time limit in accordance with the setting of the upper limit of the size of the output data.

Figure 11:
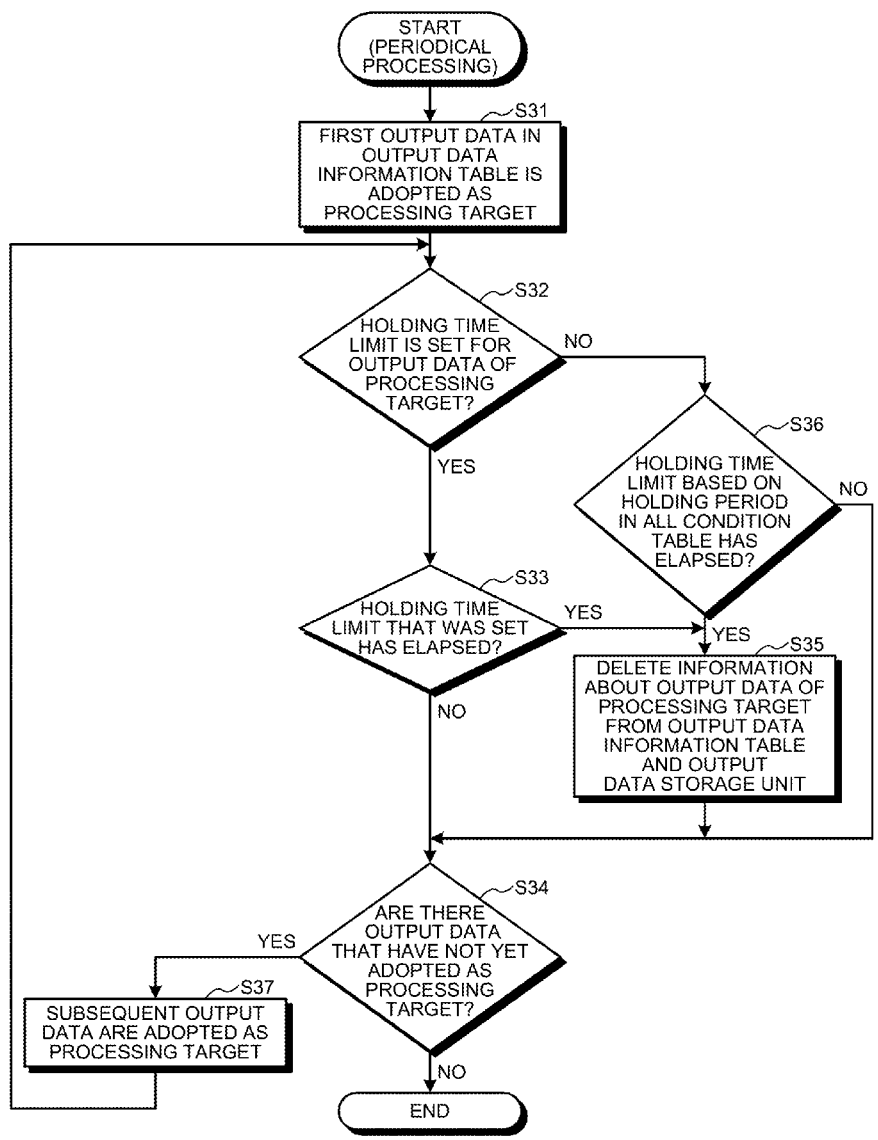
FIG. 11 is a flowchart illustrating processing performed by a CPU of a print server as illustrated in FIG. 2, that is related to deletion of output data executed with a regular interval.

Subsequently, FIG. 11 illustrates processing related to deletion of output data executed with a regular interval. This processing is processing corresponding to the functions of the periodic processing unit 409.

The CPU 41 starts processing as illustrated in the flowchart of FIG. 11 with a regular interval.

Then, first, the first piece of output data registered in the output data information table 406 is adopted as processing target (S31).

Subsequently, a determination is made as to whether the holding time limit is set for the output data of the processing target (S32). Then, when the holding time limit is set, a determination is made as to whether the holding time limit thus set has elapsed or not (S33). When the holding time limit has not yet elapsed, it is determined that the output data need not be deleted, and the processing of the output data of the processing target is terminated.

On the other hand, when the holding time limit has elapsed in step S33, it is determined that the output data need to be deleted, and information about the output data of the processing target is deleted from the output data information table 406 and the output data storage unit 407 (S35), and the processing about the output data of the processing target is terminated.

When the holding time limit is not set in step S32, the holding time limit of the output data of the processing target is calculated from the holding period registered in the all condition table 404 and the accumulation time registered in the output data information table 406 are calculated, and a determination is made as to whether or not the holding time limit has elapsed (S36). This holding time limit is a time after passed the holding period from the accumulation time.

Then, when the holding time has elapsed, it is also determined that the output data need to be deleted, and information about the output data of the processing target is deleted from the output data information table 406 and the output data storage unit 407 (S35), and the processing about the output data of the processing target is terminated.

When the holding time limit has not yet elapsed in step S36, it is determined that the output data need not be deleted, and the processing of the output data of the processing target is terminated.

Then, in any of the case where NO in step S33 and the case where NO in step S36 after execution of step S35, a determination is made as to whether or not the output data information table 406 still has output data which have not yet adopted as the processing target (S34). Then, if the output data information table 406 still has output data which have not yet adopted as the processing target, the subsequent output data are adopted as the processing target (S37), and then step S32 is performed back again to repeat the processing. If not, the processing is terminated.

According to the above processing, the output data that have elapsed the holding period thus set can be deleted. Therefore, the storage area of the storage unit is not uselessly occupied by the output data that have elapsed the holding period, and the storage unit can be efficiently used. In this case, the holding period registered in the all condition table 404 can be applied to the output data having no holding time limit designated by the user.

The embodiments have been hereinabove explained, but in this invention, specific configuration of each apparatus, specific procedure of processing, data format, and the like are not limited to those explained with the embodiments.

For example, in the above embodiments, in the individual condition table 405, the upper limit of the size of the output data is set for each user. Alternatively, the upper limit of the size of the output data may be set for a group including one or more users.

FIG. 12 illustrates an example of group data defining the group.

The group data include a group name which is identification information of the group and a user name which is identification information of a user who belongs to the group, which are associated with each other.

FIG. 13 illustrates an example of information registered in the individual condition table 405 when the upper limit of the size of the output data is set for each group. This is different from the example of FIG. 7 only in that the group name is registered in place of the user name.

FIG. 14 illustrates an example of information registered in the output data information table 406 when the upper limit of the size of the output data is set for each group.

Among the items illustrated in FIG. 14, the user name, the output data ID, and the size are the same as those in the example of FIG. 8. As illustrated in FIG. 8, the output data name, the accumulation time, and the holding period are the same as those in the example of FIG. 8, and accordingly, they are omitted in FIG. 14. The example of FIG. 14 is different from the example of FIG. 8 in that there are more items of the group names, and the information about the output data is registered for each group of user requesting accumulation of the output data.

In the setting for each group, a determination is made as to whether or not the upper limit of the size of the output data is set for a group to which the user of the output data belongs in step S12 of FIG. 9 and S22 of FIG. 10. In step S15 of FIG. 9 and S25 of FIG. 10, a determination is made as to whether or not the total size of the output file registered by the user of group to which the user belongs is more than the upper limit of the size of the output file set for the group (or of the all condition table 404). More specifically, comparison with the upper limit size for each group is made not only in view of the user who is trying to do registration, change, and the like this time but also in view of the size of the output data registered by another user of the same group.

By doing so, the capacity of the storage unit is prevented from being occupied using a less number of settings as compared with a case of individual user setting. In addition, the capacity may be shared by groups, and this allows flexible operation as compared with a condition set for each user.

The group may be generated in any classification such as division, organization, corporation, region, and the like. Of course, it is to be understood that users may be grouped in any way irrelevant of such classification explained above.

In the explanation about the above embodiments, for example, the total size of the output data registered as the condition for determining whether to allow setting of the holding period is used. Alternatively, or, in addition thereto, a condition may be defined with regard to the number of output data registered, the size of a piece of output data to be registered, and the like. A condition defining the contents other than the amount of data may also be defined.

More preferably, the upper limit of the size of the output data for each user or each group may be set in units of predetermined periods such as unit of month.

The amount of output may change depending on a period, and therefore, by doing so, it is expected to obtain an effect of saving the amount of use of the storage unit for a particular period of time, when there is a month in which the amount of output is expected to decrease in advance. In particular, in a case where output data are accumulated using the storage unit, and a fee is charged in accordance with the amount of use, the effect of reducing the cost due to this fact can be expected.

The upper limit of the size of the output data for each user or each group may be set dynamically on the basis of the usage result in the past.

It is troublesome for the administrator to set the upper limit for each user, but for example, the cost of administration by the administrator is expected to be reduced by realizing automatic adjustment of, e.g., reducing the upper limit of a user who hardly uses the storage area and using the storage area thus obtained for expansion of the upper limit of a user who uses almost a storage capacity close to the upper limit.

When the image forming apparatus 50 prints the output data for which the holding period has been set, the holding period may be notified to the user by displaying the holding period on the operation screen. Preferably, when a list of output data accumulated in the print server 40 is displayed, output data for which a holding time limit is set and output data for which a holding time limit is not set may be displayed in such a manner that they are distinguished from each other.

Output data for which a holding period is set is considered to be output data which a user wants to output again periodically or output data which a user may output in the future with a high degree of possibility. On the other hand, output data for which a holding period is not set is considered to be output data that are output only once or output data which may be seldom output. If they are mixed in the same list, it is considered to be difficult to find data when the output data for which a holding period has been set are printed again. This is because, in a normal case, output data of which accumulation date is old is located at the rear of the list.

The holding time limit of output data that are already accumulated may be changed by not only the image forming apparatus 50 but also any client apparatus such as the PC 30.

This is because, for example, when a user accumulates output data without setting a holding time limit because he/she was going to output the output data immediately but he/she is unable to retrieve printed material because of conference or leaving the office, it is troublesome for him/her to make change or accumulate the output data again upon walking up to the image forming apparatus 50.

The accumulation time of the output data in the output data information table 406 may be automatically updated at an expiration time thereof every time output of the output data is executed.

In the above embodiments, the determination is made as to whether or not output data for which a holding time limit is not set are to be deleted on the basis of whether or not the holding period that is set uniformly has elapsed with respect to the accumulation time. However, even output data for which a holding time limit is not set is considered to be reusable with a high degree of possibility if the output data are output periodically. In such case, the user does not have to set the holding time limit again manually.

The output data according to this invention are not limited to a print job. The output data can be applied to data of any given format that can be output according to any method such as projection or display.

The function of the print server 40, the functions of the PCs 30, 70, and the function of the image forming apparatus 50 (the function of the output execution apparatus 20) explained above may be realized by a configuration of apparatus different from the above embodiment.

For example, the PC 30 and the image forming apparatus 50 may carry out all or a portion of the functions of the print server 40. The functions of the print server 40 may be achieved by cooperation of multiple apparatuses. In particular, various kinds of storage units and tables such as the output data storage unit 407 may be provided in a storage unit prepared outside of the print server 40.

The embodiment of the program according to this invention is a program for causing a computer to realize the functions of the print server 40 explained above.

This kind of program may be stored in a storage unit such as a ROM provided in a computer, but can be provided as being recorded to a CD-ROM or a flexible disk, or a non-volatile storage medium (memory) such as SRAM, EEPROM, and memory card which are computer-readable recording media.

Further, an external device connected to a network having a computer-readable recording medium recording a program is also possible, or a program can be downloaded from an external device stored in a storage unit (a computer-readable recording medium) and the program can be executed.

It is to be understood that configurations of each embodiment and modification explained above may be carried out in any combination as long as they are not contradictory to each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus including:
   a storage unit configured to store output data and store condition information;
   an administration unit configured to administer a holding period of the output data held by the storage unit;
   a setting unit configured to set the holding period of the output data; and
   a reception unit configured to receive a setting request of a holding period for the output data, wherein
   the setting unit is configured to control the setting of the holding period for the output data, on the basis of the condition information in accordance with the setting request, and the condition information is information about a condition defining an amount of data of the output data stored by the storage unit.

2. The information processing apparatus according to claim 1, further comprising:
   a determination unit configured to determine whether or not to accept the setting of the holding period for the output data on the basis of the condition information in accordance with the setting request,
   wherein the setting unit controls the setting of the holding period for the output data, in accordance with a determination result determined on the basis of the condition information by the determination unit.

3. The information processing apparatus according to claim 1, wherein the condition information can be set in association with a user or a group of users.

4. The information processing apparatus according to claim 1, wherein a holding period that is set in advance is applied to the output data that are controlled so that the setting unit does not allow the setting of the holding period therefor.

5. The information processing apparatus according to claim 1, further comprising:
   a unit configured to delete the output data, of which the holding period that is set has elapsed, from the storage unit.

6. The information processing apparatus of claim 1, wherein the condition information is a limit of data per user accumulated in the storage unit.

7. The information processing apparatus of claim 6, wherein the setting unit is configured to control the setting of the holding period based on whether output data accumulated by the user exceeds the limit.

8. An information processing system connected to a plurality of information processing apparatuses via a network, the plurality of information processing apparatuses configured to transmit and receive data, any one of the plurality of information processing apparatuses comprising:
- a storage unit configured to store output data and store condition information;
- an administration unit configured to administer a holding period of the output data held by the storage unit;
- a setting unit configured to set the holding period of the output data; and
- a reception unit configured to receive a setting request of a holding period for the output data, wherein
- the setting unit is configured to control the setting of the holding period for the output data, on the basis of the condition information in accordance with the setting request, and the condition information is information about a condition defining an amount of data of the output data stored by the storage unit.

9. The information processing system according to claim 8, wherein any one of the plurality of information processing apparatuses further comprises:
- a determination unit configured to determine whether or not to accept the setting of the holding period for the output data on the basis of the condition information in accordance with the setting request, and
- wherein the setting unit controls the setting of the holding period for the output data, in accordance with a determination result determined on the basis of the condition information by the determination unit.

10. The information processing system according to claim 8, wherein the condition information can be set in association with a user or a group of users.

11. The information processing system according to claim 8, wherein a holding period that is set in advance is applied to the output data that are controlled so that the setting unit does not allow the setting of the holding period therefor.

12. The information processing system according to claim 8, wherein any one of the plurality of information processing apparatuses further comprises:
- a unit configured to delete the output data, of which the holding period that is set has elapsed, from the storage unit.

13. The information processing system of claim 8, wherein the condition information is a limit of data per user accumulated in the storage unit.

14. A non-transitory computer-readable recording medium that contains a computer program that, when executed on a computer, causes the computer to function as
- a storage unit configured to store output data and store condition information;
- an administration unit configured to administer a holding period of the output data held by the first storage unit;
- a setting unit configured to set the holding period of the output data; and
- a reception unit configured to receive a setting request of a holding period for the output data, wherein
- the setting unit is configured to control the setting of the holding period for the output data, on the basis of the condition information in accordance with the setting request, and the condition information is information about condition defining an amount of data of the output data stored by the storage unit.

15. The non-transitory computer-readable recording medium according to claim 14, wherein the computer program further causes the computer to function as a determination unit configured to determine whether or not to accept the setting of the holding period for the output data on the basis of the condition information in accordance with the setting request, and the setting unit controls the setting of the holding period for the output data, in accordance with a determination result determined on the basis of the condition information by the determination unit.

16. The non-transitory computer-readable recording medium according to claim 14, wherein the condition information can be set in association with a user or a group of users.

17. The non-transitory computer-readable recording medium according to claim 14, wherein a holding period that is set in advance is applied to the output data that are controlled so that the setting unit does not allow the setting of the holding period therefor.

18. The non-transitory computer-readable recording medium according to claim 14, wherein the computer program further causes the computer to function as a unit configured to delete the output data, of which the holding period that is set has elapsed, from the storage unit.

19. The non-transitory computer-readable recording medium of claim 14, wherein the condition information is a limit of data per user accumulated in the storage unit.

* * * * *